Aug. 12, 1958

N. SZASZ 2,847,167

MILLING PROCESS FOR WHEAT AND SIMILAR GRANULAR FOOD PRODUCTS

Filed Dec. 16, 1954

INVENTOR.
Nandor Szasz
BY William C. Babcock
ATTORNEY

United States Patent Office 2,847,167
Patented Aug. 12, 1958

2,847,167
MILLING PROCESS FOR WHEAT AND SIMILAR GRANULAR FOOD PRODUCTS

Nandor Szasz, Minneapolis, Minn., assignor to General Mills, Inc., a corporation of Delaware Application December 16, 1954, Serial No. 475,708

11 Claims. (Cl. 241—5)

My invention relates to processes for milling flour from grain such as wheat, and similar granular food products, i. e., corn, barley and soybeans. More particularly my invention relates to improvements in what are generally thought of as the breaking operations used in such flour milling processes for the preparation of middlings suitable for subsequent reduction to flour. During these operations the grain or other kernels are broken and the hull, the germs and the endosperm particles separated from each other. The endosperm particles are generally treated, for example by purification, as part of their preparation for subsequent reduction. The present invention particularly includes novel steps for treatment of such endosperm particles prior to their reduction. By means of the improvements set forth herein, the final reduction system by which the middlings are reduced to flour may also be shortened and simplified.

The standard practice of flour milling from wheat, for example, comprises the following steps: first, all impurities of a size different from the size of the grain kernels are removed by known screening and aspiration methods, and admixtures of oats, barley, cockles or the like are separated in disc separators. Surface contaminations are removed by scourers, sometimes in combination with washing. The thus or in any other manner dampened grain kernels are tempered in tempering bins wherein the kernels are kept for a time ranging in the average from a few hours up to about three days until the endosperm becomes mellow. Thereafter the wheat is again scoured and aspirated and, thus having been cleaned and tempered, conveyed to the first of a series of break rolls which successively are adapted for finer milling.

After each break the product is sifted, the overtails are brought to the next pair of break rolls and the thoroughs graded into flour and into middlings of differing coarseness. The middlings from each pair of break rolls, being not only of different size but also of different quality, are cleaned separately on one of a series of middling purifiers and thereafter gradually reduced into flour on a number of smooth rolls.

One object of my new milling method is to avoid the numerous disadvantages of known milling processes.

Another object is the provision of improved milling methods utilizing impact steps for the preparation of middlings.

Still another object is the provision of improved methods for cleaning and tempering grain, in combination with impact steps for breaking such grain adapted to provide a better intermediate product in the form of more uniform middlings.

A further object is an improved method of applying special impact steps to at least the coarser middlings formed in the breaking operation in order to equalize the middlings without the production of substantial amounts of flour, before such middlings are subjected to the operation of a reduction system for the main production of flour.

By way of further explanation of the manner in which the various disadvantages of the prior art are met and the above objectives accomplished, the following comparison is of interest. For example, the presently used method of removing surface dirt by scouring results in damaging the hulls. In consequence thereof the hull breaks into small fractions more easily thus producing undesired pulverized bran. This bran powder cannot be separated from the flour, adds to its ash content, and thus lowers its quality. In my process, however, the surface dirt is removed by washing, and no scouring is applied. The most efficient cleaning can be achieved by aspirating the prebroken grain, thus removing impurities which were originally in the crease of the kernel. Thus my process cleans the grain kernels without weakening their hull portions.

The advantages of a long gradual breaking process are known in the art. The longer the process, the weaker the crushing forces that may be applied, thus resulting in more and coarser middlings, less break flour and less pulverized bran in the flour. In using roller mills, each additional break system requires not only the expensive roller mills, but also separate sifters, elevators and spouting. In my new multiple impact milling process any additional break requires only the addition of one more grinding stage within the multiple impact mill. If sifting between the breaks is applied, it is enough to use scalpers after each impact break instead of complete sifters. The middlings of different breaks are of such uniform quality that they can be graded and purified together. This is a great simplification of the flow-sheet which allows the application of a long gradual reduction without extremely high expenses for equipment and maintenance.

In the conventional milling process the grain may attain the desired elastic hull by tempering. But as the breaking process proceeds, part of the surface moisture of the grain kernels evaporates and the hull becomes brittle. In my new process the difference between the grinding resistance of the brittle endosperm and the elastic hull is maintained throughout the whole breaking process. This result is obtained according to a preferred form of the invention by eliminating the sifting between the successive impact breaks.

In the conventional milling process a considerable part of the germs are crushed between the rolls and their fat content, on mixing with the flour, impairs its keeping quality. In my new process, a large part of the germs are separated from the kernels at the head end of the mill and the rest are freed during the following breaks in substantially undamaged condition.

Only one third of the floor space needed for roller mills is required for multiple impact mills of the same capacity and the heavy roller mills are replaced by the substantially lighter impact mills.

According to the preferred form of the invention, the middlings obtained from the impact breaks are equalized by submitting such middlings to a series of carefully controlled successive impact steps, before the middlings are substantially reduced to flour. This equalization of coarse and medium middlings with the help of multiple impact mills results in a greater uniformity in the particle size of the middlings which are to be reduced to flour on smooth rolls. This greater uniformity simplifies the reduction process.

At the same time, the combination of these additional impact equalizing steps prior to a roller reduction system makes it possible to obtain certain benefits from roller reduction for the final flour production. I have found that, in contrast to some of the advantages of impact steps over roller milling in the breaking or middlings preparation steps, roller reduction methods have the advantages of smaller power consumption and as a result of flattening of branny particles, a more efficient separation of these impurities from the pure endosperm during the reduction process, as compared to other methods of reduction such as impact. Hence the preferred form of the invention contemplates the incorporation of these multiple impact equalizing steps as a novel intermediate operation following the preparation of purified middlings and prior to the production of finished flour by roller reduction.

In addition to the important advantages discussed above, my new process results in a number of improvements in the quality of intermediate and finished products of the milling process, namely in that the middlings and the flour are of more uniform granulation, lowering of the ash and fat content of the flour, and as a consequence better keeping and baking qualities of the flour.

The above and other objects of my invention will be more fully understood from the following specification when read together with the accompanying drawing.

Figure 1:
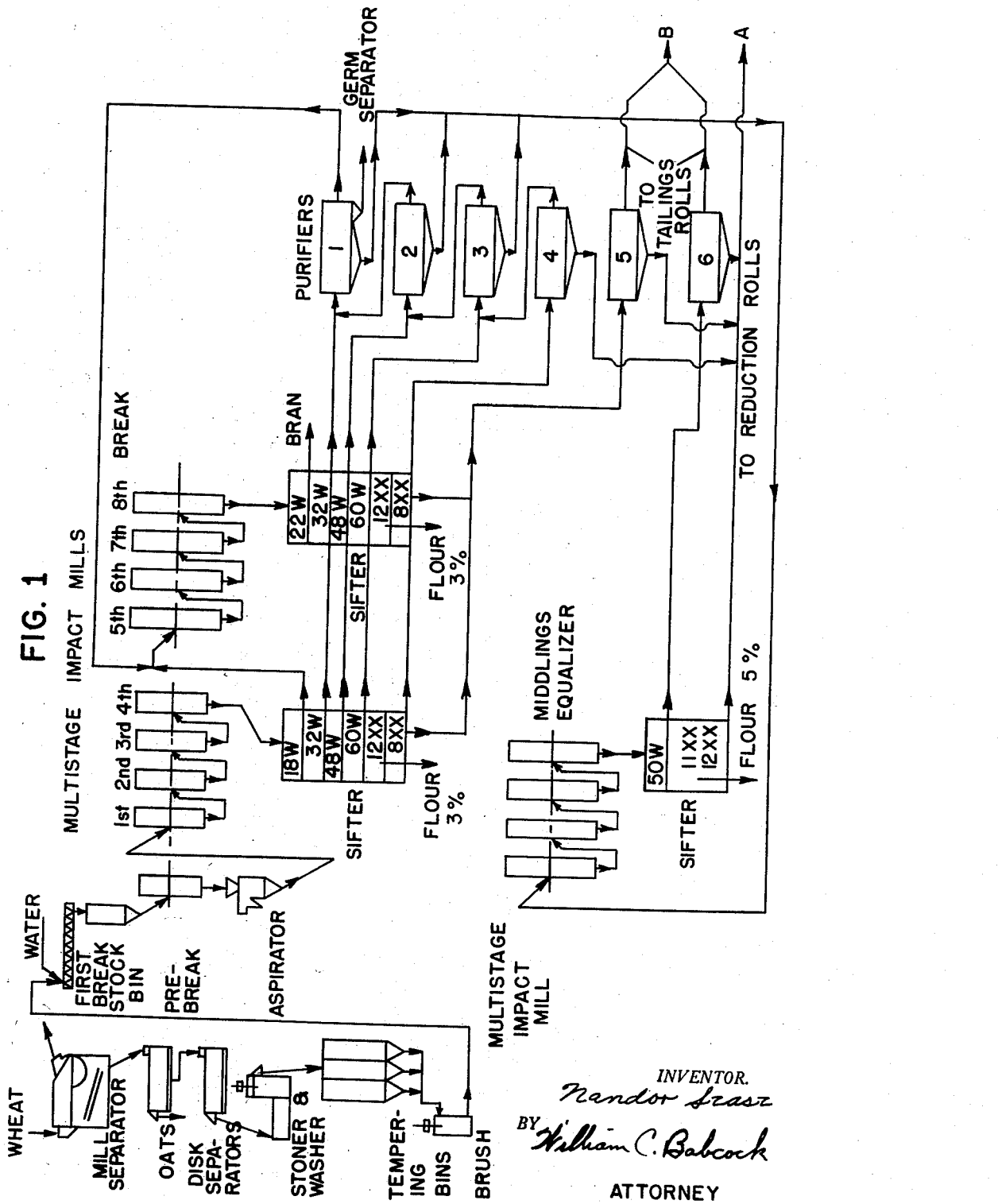
Figure 1 is a flow sheet which shows those portions of my milling method pertaining to middlings preparation, i. e., cleaning, tempering, breaking, grading, purifying and equalizing.

My new process for milling wheat and similar granular food products will now be described in detail with reference to Figs. 1 and 2 of the drawing.

As shown in the flow sheet illustrated in Fig. 1 the wheat coming from a storage bin is first subjected to a cleaning procedure. It passes through a mill separator in which practically all impurities which are larger or smaller than the wheat kernel as well as the dust are eliminated and thereafter through a pair of disc separators, in the first of which all kernels longer than wheat kernels, such as oats, are separated, whereas in the second separator round grains, such as cockles or the like are removed. Thereafter the wheat enters a stoner and washer wherein stones and other heavy impurities are separated from the wheat and subsequently the same is thoroughly washed. Any surplus moisture is removed by centrifuging in a whizzer and the wheat introduced into tempering bins wherein it is allowed to remain only for such a period of time as is sufficient to let part of the added moisture be absorbed by the endosperm but not long enough to completely deprive the endosperm of its original brittleness. This means that the tempering time will be shorter than it would be if the same wheat were prepared for processing on roller mills.

In contrast to known methods of tempering for roller milling, where the tempering time is long enough for the endosperm to change in structure and become what millers describe as "mellow," the main tempering for impact milling must be shorter, as pointed out above.

After leaving the tempering bins the wheat is brushed to remove loosened hull particles which adhere weakly to the grain. Any additional dust is also removed by aspiration. The wheat thus prehandled is again dampened and passes through a screw conveyor for better moisture distribution. The wheat is then introduced into another tempering bin or first break stock bin wherein it remains for a short time so that the moisture will stay in the hull only and will not be absorbed by the endosperm. This will distribute substantially more relative moisture in the hulls and substantially less relative moisture in the endosperm than in the case of grain tempered for processing on a roller mill break system.

The next step shown in the flow diagram involves an optional but very desirable improvement in treating the wheat before the same enters the first multistage impact mill unit. As shown, the wheat coming from the bin enters a single impact mill which runs at lower speed than the impact mills used in the subsequent stages. The weak impact in this added mill just breaks the kernels essentially into two parts and frees the germ at least to a very large extent. In the following aspiration the freed germs, the loose hull particles (beeswings) and the dirt accumulated in the crease of the wheat kernel are separated, and only thereafter is the broken up wheat introduced into the multistage impact mill unit. The just described cleaning of the already pre-broken kernels is much more efficient than the conventional cleaning with scourers, because the contaminations sitting in the crease of the kernel are also removed.

The thus cleaned, tempered and pre-broken wheat is then subjected to a multistage impact breaking operation, for example in a four-stage impact mill which may be of the type shown in detail in Figs. 3 and 4 and described below. In this mill the wheat passes directly from one stage to the following stage without intermediate sifting. From the last stage of said impact mill the wheat is discharged upon a sifter provided with a number of screens, for example as shown, the upper screen being of 18W mesh, the next of 32W mesh, the following of 48W and 60W mesh, and thereafter 12XX and 8XX bolting cloth.

The overs from said 18W screen which include mostly hull portions to which endosperm particles adhere are carried to another multistage impact mill unit which preferably operates with a stronger impact, comprising for example, as shown, a second series of four stages immediately following each other without intermediate sifting. The wheat coming therefrom is discharged upon a second sifter which comprises a plurality of screens of increasingly finer mesh, for example as shown, of 22W, 32W, 48W, 60W, 12XX, and 8XX.

The overtail from the first screen in the second sifter of 22W mesh is finished bran.

The 32W, 48W and 60W mesh screens in both sifters are chosen with the same mesh to provide similarly graded coarse and medium middlings from each series of multistage impact breaks. As indicated in the flow sheets, the middlings of each given grade from the first sifter are combined with the similar middlings of the same given grade from the second sifter. The combined overtails from these corresponding screens are then conveyed to the purifiers 1, 2 and 3 respectively. Similarly, the overs from the 8XX screens of both sifters, which may be considered as fine middlings, are combined and carried together to an additional purifier 4. Thus each purifier cleans only middlings of essentially uniformly sized particles. The granules which do not pass through the purifiers 2, 3, and 4, either because they are too coarse or because they are lighter than the pure middlings and swim on top of the mass which moves along the purifier sieve, are carried into the preceding purifier 3, 2 and 1, respectively, and there repurified.

From the first purifier any germs and other particles of similar size which were not removed by the pre-break impact and aspiration are brought to a germ separator which is not shown in the drawing. The overtail of this first purifier, consisting of endosperm particles with hull portions adhering thereto, is reintroduced into a second unit of the multistage impact mill for continued breaking.

The throughs from the 8XX silk screen in both sifters, which throughs, i. e. dunst, comprise granules finer than middlings and coarser than flour may be cleaned in the purifier 5. In some cases, if desired, this purifier 5 can be omitted, and the dunst carried directly to the reduction system along flow line A. According to the preferred form of the present invention, the throughs or purified coarse and medium middlings from at least two of the purifiers 1, 2 and 3 are combined and carried to a middling equalizer where they are subjected to carefully controlled impact to yield smaller and more uniform middlings with a minimum of flour production. Then the equalized middlings are fed to another sifter comprising screens of 50W mesh and 11XX and 12XX silk screens. The overtails from the 50W screen are carried to a purifier 6 and the throughs of this purifier, as well as the throughs from the purifiers 4 and 5 are fed to the reduction roll system as shown by flow line A in Figs. 1 and 2. The equalized middlings which passed through the 50W screen and over the flour cloths are fed directly to the reduction system along line A. The overtails from the purifiers 5 and 6 are carried to tailings rolls, as shown by the flow line B in Figs. 1 and 2.

The equalizing of at least the coarser middlings by carefully controlled impact thus makes it possible to provide more uniform middlings which can be re-combined with some of the finer purified middlings for reduction in a single series flow through roller reduction mills and sifters. Thus the middlings equalizing step eliminates some of the complications inherent in previous known methods of standard flour milling.

One of the reasons for the complicated flows used in standard wheat flour milling consists in the fact that middlings of different size are produced in the breaking process and that these middlings have to be reduced separately on rolls with their gaps set according to the respective size of the different middlings. This invention provides, in the form of the middlings equalizer, a means to reduce to coarse and medium size middlings to the size of fine middlings.

If a middling of a certain size and mass hits an impact face in a centrifugal impact mill, the velocity will determine whether the particle will break apart or stay substantially intact. According to the formula for the kinetic energy, $$E = \frac{mv^2}{2}$$

the energy is proportional to the mass and the square of the velocity. In breaking a sphere of diameter D apart along its meridian, the minimum energy needed is proportional to the new surface created, which is a circle with D diameter. The mass of a particle is proportional to the cube of the diameter and the new surface created in the crushing process is proportional to the square of its diameter.

Thus I have found that when reducing a granular material consisting of granules of different size, at a certain moderate speed of the impact mill the largest granules will break up first and the small ones will pass through the machine substantially intact. In repeating this process of impacting, the stock which originally was fed into the machine and was of widely different particle size, becomes gradually more and more uniform in size. It needs a number of repeated steps of low speed impact to accomplish the expected equalizaion of middlings, without creating too much flour. These equalized middlings can then be combined with the fine middlings created in the breaking process and this comparatively uniformly sized stock can be ground together on the first reduction rolls.

As indicated above, the impact required for equalizing of middlings with minimum flour product must be carefully controlled. The equalizing steps should be adjusted, so that the particles of stock are thrown against the impact faces with a velocity generally in the range from 150 to 220 ft. per second, and preferably at velocities of substantially 180 to 200 ft. per second. The desired impact velocities can be obtained either by adjustment of the angular speed of the rotor or by choice of a suitable diameter for the rotor or both. These velocities are based on arrangement of impact surfaces so that the angle of impact is substantially 90°. For impact angles more than 5° or 10° away from this perpendicular, the above velocity ranges must be increased accordingly.

These impact velocities, while capable of substantial adjustment within the ranges indicated, should be chosen with reference to the particular stock so that a minimum of flour is produced in this step. For example, in the flow shown in Figs. 1 and 2, the percentage of flour obtained from the sifter following the middlings equalizer should not substantially exceed 5% of the starting wheat weight. Since the flow diagram also indicates that substantially 3% of flour is formed on the first series of impact breaks and another 3% on the second series of impact breaks, it will be apparent that substantially only 11% flour will have been obtained by the time the middlings equalizing step is completed. The major portion of the flour, which will be of the order of 60% of the wheat weight, will then be obtained from the roller reduction system shown in Fig. 2.

By way of comparison with the impact velocity ranges set forth above as suitable for equalizing the middlings, I have found that substantially higher impact velocities of the order of 280 ft. per second are required for the initial breaking steps by which the endosperm is first separated from the hulls. Also, if impact steps were to be used for reduction of middlings in place of the conventional reduction rolls, I have found that substantially higher impact velocities are required than even those velocities required for the initial break. Thus impact velocities of 300-500 ft. per second and more would be required for actual reduction of middlings to particles of flour size. In other words, the impact velocities required for equalizing the middlings according to the present invention are substantially lower than the velocities required either for initial breaking or for subsequent reduction to flour.

While the middlings equalizing impact portion of the process may have some application in connection with purified middlings originally produced by methods other than impact break, i. e., by roller breaks, it is my belief that a very superior combination can best be achieved when the middlings equalizing step is incorporated in combination with initial impact breaks, possibly because the impact breaks provide middlings of more uniform density, which have not been subjected to variable compressions as in the case of roller mill breaks.

Because of the uniform small size of the middlings which leave the equalizer, and which are re-combined with finer middlings from at least the fourth purifier, the combined middlings stock passing to the reduction system by the flow line A can be processed on a simplified and shortened roller reduction system. This system is illustrated as including five sets of middlings reduction rolls. While smooth rolls are sometimes considered more customary for reduction systems, corrugated rolls may be used in certain cases. Conventional reduction systems receive many different stocks and feed them through different reduction rolls in parallel. Here only a single stock comes to the reduction part of the system. This stock is all fed to the first reduction rolls and then passes successively through additional rolls in series, rather than parallel, until the desired final flour yield is obtained. Thus fewer reduction rolls and a simpler flow are made possible.

Each of these rolls is followed by a sifter in which any remaining branny particles flattened by the reduction rolls can be first separated over suitable wires such as the 60W, 62W, 64W, 68W and 72W screens of the respective sifters. These branny portions are then fed to the tailings roll in combination with the other tailings material indicated by the flow line B in the diagram.

Figure 2:
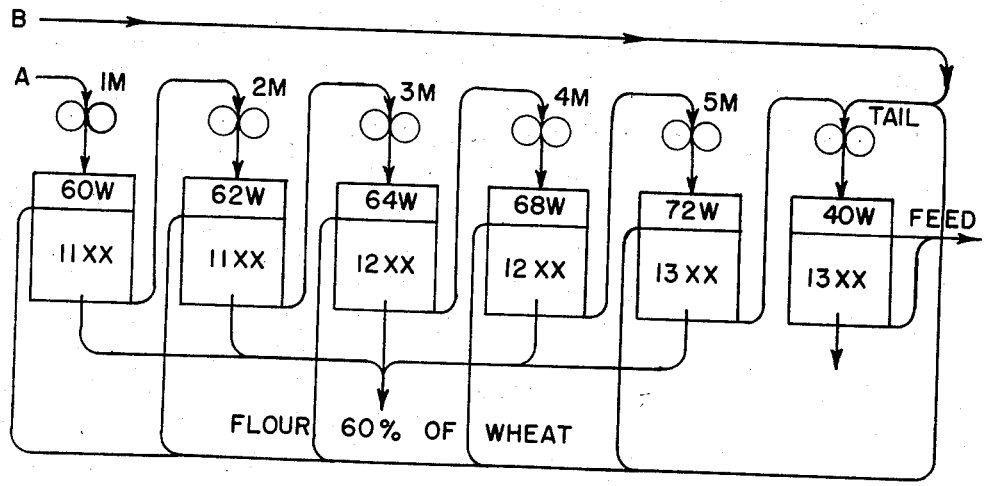
Fig. 2 is an extension of the flow sheet of Fig. 1 showing a roller reduction or finishing system suitable for the final production of the flour.

The throughs of the flour cloths of the respective sifters are collected to constitute the major portion of flour obtained in the total flow of Figs. 1 and 2. The overs of each flour cloth are fed successively in series to the next following middlings reduction rolls as shown in the diagram, with the overs of the final flour cloths of the fifth middlings sifter being fed also to the tailing rolls.

Figure 3:
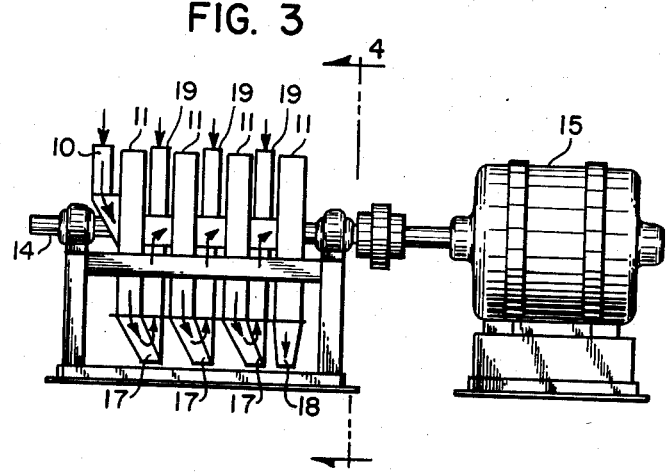
Figs. 3 and 4 show respectively, a front view and a side view of a multistage impact mill as used in the methods according to my invention.
Figure 4:
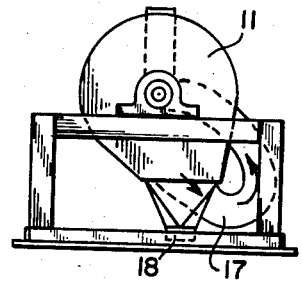

An embodiment of a multistage impact mill for use in my new process is illustrated in Figs. 3 and 4, which show a front view and a side view, respectively, thereof.

The tempered grain kernels or the combined and purified middlings, as the case may be, are introduced into the mill through the feed chute 10. The mill in the example shown comprises four stages and each stage comprises a rotor with fling channels, or a plurality of channeled fling arms, within a housing 11. The rotors of all stages are mounted upon a common shaft 14 which is driven in any convenient manner, for example by the electric motor 15. The grain kernels leaving the said channels are flung against suitable impact faces spaced around the interior of the housing opposite the rotor and are broken. Thereafter the kernels pass through connecting channels 17, into the next stage where the breaking of the kernels is repeated and increased, until the broken up kernels leave the last stage through the discharge opening 18. The second and the following stages may each be provided with alternate or supplemental feed chutes 19, which are particularly useful where any portion of the product is to be introduced at an intermediate stage of the multiple impact mill.

Details of construction of rotors and impact surfaces suitable for use in the individual impact stages or units 11 are shown, for example, in British Patent No. 509,524. The combination of a plurality of these units in the manner described in connection with Figs. 3 and 4 offers the further advantage that the material can be carried quickly from one stage to the other by the flow of air drawn through the connecting channels 17 by the movement of the rotors. In each unit of this type, the normal arrangement is such that the grain kernels are projected only once against the impact surfaces, at controlled effective velocities in the ranges specified above. Random impacts of the particles against each other, and repeated projection of the individual kernels against the impact surfaces, are substantially avoided or minimized in known manner by suitable orientation of the impact surfaces, or by the use of guards, as shown, for example, in said British patent.

According to the foregoing specification I have described various aspects of improved milling process steps which substantially accomplish the objectives initially set forth. Since minor variations and changes in the exact details of the process features will be apparent to persons skilled in this field, it is intended that this invention shall cover all such changes and modifications as fall within the spirit and scope of the attached claims.

This application is a continuation-in-part of my earlier application Serial No. 127,839, filed November 17, 1949 for Milling Process for Wheat and Similar Granular Food Products, now abandoned.

Now therefore I claim:

1. In the process of milling wheat and other natural granular food products the steps comprising cleaning the grain kernels without weakening their hull, applying a short final tempering to the grain to make only the hull elastic, impacting the thus cleaned and tempered grain in a plurality of continuously succeeding steps in each of which the grain is projected at predetermined speed against an impact surface in a manner designed to provide substantially a single effective impact at said speed, substantially maintaining the difference in grinding resistance between the elastic hull and the brittle endosperm during said succeeding impact steps, grading the broken up granules and thereby obtaining middlings of graded size, separately purifying the middlings of the respective graded sizes, equalizing the purified middlings by subjecting at least the coarser graded sizes to a series of immediately successive impact steps without intermediate sifting, and thereafter finishing the equalized middlings to flour upon reduction rolls.

2. In the process of milling wheat and other natural granular food products the steps comprising cleaning the grain kernels without weakening their hull, applying a short final tempering to the grain to make the hull elastic, impacting the thus cleaned and tempered grain in a first series of continuously succeeding steps in each of which the grain is projected at predetermined speed against an impact surface in a manner designed to provide substantially a single effective impact at said speed, substantially maintaining the difference in grinding resistance between the elastic hull and the brittle endosperm, grading the broken up granules to separate the coarser hull portions and obtain middlings of graded size, impacting the separated coarser hull portions in a second series of continuously succeeding steps with stronger impact, grading the output of the second series of breaks and thereby obtaining further middlings of graded size, purifying the middlings from both grading operations, equalizing the purified middlings by subjecting at least the coarser middlings to a series of immediately successive impact steps without intermediate sifting, and thereafter finishing the equalized middlings to flour upon reduction rolls.

3. The process of milling wheat and other natural granular food products comprising the steps of tempering the grain until only the hull is elastic, subjecting the tempered grain to at least one series of impact breaks in each of which breaks the grain is projected at predetermined speed against an impact surface in a manner designed to provide substantially a single effective impact at said speed, the entire product from at least one impact break in the series being fed directly to the next impact break without intermediate separation, screening the resulting product to remove the coarser hull portions and grading the remaining portions into at least a coarse middlings fraction and a medium middlings fraction, separately purifying said coarse and medium middlings fractions in first and second purifiers respectively, combining all of the purified middlings from said first and second purifiers, subjecting the combined and purified middlings to a series of impact equalizing steps in each of which the product is projected at predetermined speed against an impact surface, maintaining the last mentioned speeds of impact within a range producing more uniform finer middlings without substantial reduction of said middlings to flour, and thereafter finishing the equalized middlings to flour by roller reduction.

4. A milling process according to claim 3 in which the entire product from each impact break except the last in the series is fed directly to the next impact break without intermediate separation and in which the entire product from each impact equalizing step except the last is fed directly to the next impact step without intermediate separation.

5. The process of milling wheat and other natural granular food products which comprises tempering the grain until only the hull is elastic, subjecting the tempered grain to a first series of successive impact breaks in each of which the grain is projected at a predetermined speed against an impact surface in a manner designed to provide substantially a single effective impact at said speed, removing the coarser hull portions from the resulting product and separating the remaining portions into at least a coarser middlings fraction containing substantially whole germ, a medium middlings fraction containing substantially no germ and a finer flour and dust fraction, purifying the coarse middlings fraction and removing a portion containing the germ therefrom in a first purifier, separately purifying the medium middlings fraction in a second purifier, combining purified middlings from said first and second purifiers, equalizing the combined and purified middlings by subjecting them to a series of immediately successive impact steps without intermediate sifting in each of which the material is projected at predetermined speed against an impact surface in a manner designed to provide substantially a single effective impact at said speed, maintaining the last mentioned speeds of impact within a range producing more uniform final middlings without substantial reduction of said middlings to flour, and subsequently finishing the equalized middlings to flour on reduction rolls.

6. The process of milling wheat and other natural granular food products comprising the steps of subjecting the grain to at least one series of impact breaks in each of which breaks the grain is projected at predetermined speed against an impact surface in a manner designed to provide substantially a single effective impact at said speed, screening the resulting product to remove the coarser hull portions, separating the remaining portions into at least three middlings fractions of different particle size, two of which fractions respectively include those coarse and medium middlings passing over substantially a #60 wire screen and the other of which includes those fine middlings passing through such a screen, separately purifying said differently sized middlings fractions in separate purifiers, combining all of the purified middlings from at least two of said separate purifiers handling coarse and medium middlings, subjecting the combined and purified coarse and medium middlings to a series of impact equalizing steps in each of which the product is projected at predetermined speed against an impact surface in a manner designed to provide substantially a single effective impact at said speed, maintaining the last mentioned speeds of impact within a range producing more uniform finer middlings without substantial reduction of said middlings to flour, thereafter re-combining the purified and impacted coarse and medium middlings with the purified fine middlings and then finishing said middlings to flour on reduction rolls.

7. A milling process according to claim 6 in which all of said re-combined middlings are fed in a single common stream to a simplified roller reduction system in which said middlings pass in series through successive reduction rolls with intermediate sifting.

8. In the process of milling natural granular food products such as wheat, barley, corn and soybeans, which comprises subjecting the grain to a series of breaks, grading the resulting product into a plurality of individual middlings fractions differing in particle size, and separately purifying the individual middlings fractions, the improvement which comprises equalizing the purified middlings by subjecting at least the coarser middlings to a series of successive impact equalizing steps in each of which the material is projected at predetermined speed against an impact surface in a manner designed to provide substantially a single effective impact at said speed, the number and strength of impact steps in said series being sufficient to equalize substantially all of said middlings to uniform smaller size and the impact velocities in said equalizing steps being lower than the velocities required for substantial reduction of said middlings to flour, combining the purified and impacted coarser middlings with separately purified finer middlings, and thereafter reducing said combined middlings to flour.

9. A milling process according to claim 8 in which the material from at least one impact equalizing step is fed directly to the next impact equalizing step in the series without intermediate separation.

10. A milling process according to claim 8 having at least four impact equalizing steps with the material from each impact equalizing step except the last fed directly to the next impact equalizing step without intermediate separation.

11. The process of milling wheat and other natural granular food products to obtain middlings suitable for purification and reduction into flour which comprises initially tempering the grain until only the hull is elastic, terminating the initial tempering before the original brittleness of the endosperm is substantially destroyed, and thereafter applying a short final tempering to the grain, thereby distributing substantially more moisture in the hulls and substantially less moisture in the endosperm than in the case of grain tempered for processing on roller mills, promptly subjecting the tempered grain to a first series of successive impact breaks in each of which the grain is projected at a predetermined speed against an impact surface in a manner designed to provide substantially a single effective impact at said speed, the material from each impact break being fed directly to the next impact break in the series without intermediate separation, removing the coarser hull portions from the resulting product and separating the remaining portions into at least two middlings fractions of different particle sizes; subjecting the removed coarser hull portions to a second series of successive impact breaks similar to the first series but with a stronger impact, the material from each impact break again being fed directly to the next impact break in the series without intermediate separation, removing the coarser branny portion from the resulting final product, and separating the remaining final portions into at least two middlings fractions of different particle sizes, said first and second series of impact breaks constituting substantially the entire breaking portion of the milling process, separately purifying the middlings fractions of each different size, and thereafter equalizing the purified middlings by subjecting them to a series of impact equalizing steps in each of which the product is projected at predetermined speed against an impact surface in a manner designed to provide substantially a single effective impact at said speed while maintaining the last mentioned speeds of impact within a range producing more uniform finer middlings without substantial reduction of said middlings to flour.

References Cited in the file of this patent

UNITED STATES PATENTS

| | | |
|---|---|---|
| Re. 17,829 | Dienst | Oct. 14, 1930 |
| 637,837 | Theiss | Nov. 28, 1899 |
| 1,424,608 | Walcott | Aug. 1, 1922 |
| 2,464,212 | Carter et al. | Mar. 15, 1949 |

FOREIGN PATENTS

| | | |
|---|---|---|
| 509,524 | Great Britain | July 18, 1939 |

OTHER REFERENCES

Impact Grinding, by Hibbs et al., American Miller and Processor, December 1947; Scientific Library, No. TS 2120 A512, pp. 38, 41, 42, 43 and 83.